F. G. HUGHES.
ANTIFRICTION BEARING.
APPLICATION FILED OCT. 26, 1911.
1,176,455.
Patented Mar. 21, 1916.
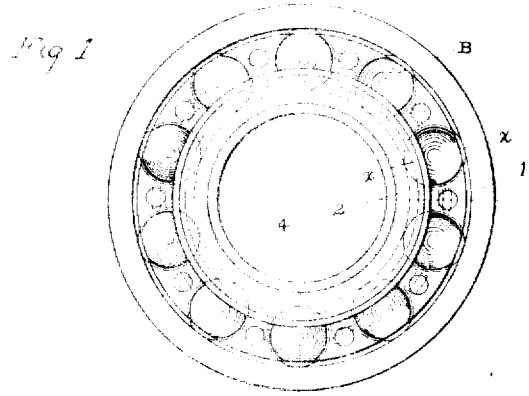
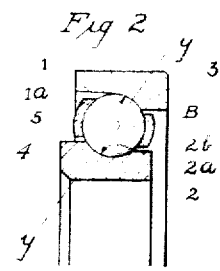
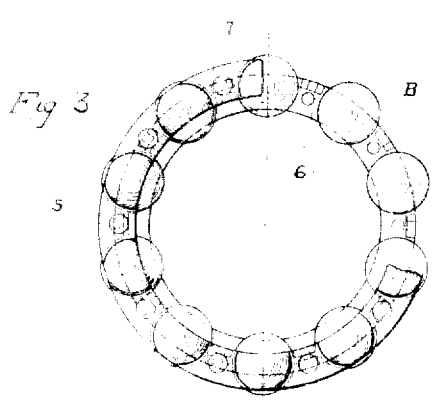
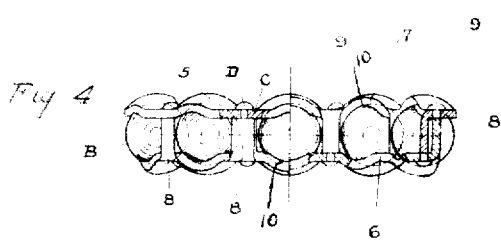
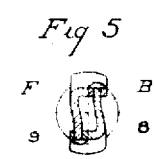

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,176,455.  Specification of Letters Patent.  Patented Mar. 21, 1916.

Application filed October 26, 1911. Serial No. 656,844.

*To all whom it may concern:*

Be it known that I, FREDERICK G. HUGHES, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to antifriction bearings and more particularly to bearings of the type having a separator or spacer for the antifriction members thereof. In bearings of this type as heretofore constructed difficulty has been experienced in providing a simple two-piece separator which, while strong and rigid, could at the same time be inexpensively manufactured and accurately and quickly assembled.

One object of my invention is to provide a two-piece separator of strong and rigid, and at the same time, inexpensive construction, and which may be easily and accurately assembled.

Another object is to provide an antifriction bearing, having a separator for its antifriction members whose parts always maintain their proper alinement and spacing.

Another object is to provide a separator whose sections are rigidly connected to resist the wedging action of the antifriction members.

Another object is to provide an antifriction bearing having inclined raceways and having an efficient and rigid separator peculiarly adapted to fit between the raceways of the bearing members.

Another object is to provide a separator whose construction is strong and rigid and at the same time such as to peculiarly adapt the separator for use in a bearing having inclined raceways.

To these ends and also to improve generally upon devices of the character indicated, my invention consists in the various matters hereinafter described and claimed.

In the accompanying drawings: Figure 1 is a side view of an assembled bearing embodying my invention; Fig. 2 is a section on line $x$—$x$ of Fig. 1; Fig. 3 is a side view of an assembled separator and antifriction members, a portion of one of the separator sides being broken away; Fig. 4 is a plan view of the separator illustrated in Fig. 3, portions thereof being broken away; and Fig. 5 is a sectional view of a modified separator.

The illustrated embodiment of my invention comprises a separator, designed generally as 5, shown as composed of but two preferably annular opposed sections 6 and 7 which I may term front and rear plates respectively. Each section is provided with ball pockets, as 10. One plate, as 6, is provided, as integrally, with a preferably circular series of connectors, spacers, braces or fingers, as 8. These fingers are provided for connection with the opposite plate, as 7, and serve to space and to rigidly connect the plates.

Preferably the fingers are arranged at the periphery of one section, as 6, and abut against and are connected with the opposed section, as 7, approximately along the line defined upon such opposed section by the adjacent ends of the rotation axes of the antifriction members received in the separator and here shown as the balls B. Preferably, and as here shown, this line approximately corresponds with the center line of the section and, therefore, as here illustrated, the peripheral fingers of one section meet the other approximately along its center line. With the fingers thus disposed the finger-receiving section is rigidly connected to the fingered section at the points where the greatest wedging stress, from the antifriction members, occurs upon such finger-receiving section. This wedging stress is due to the separator, which is carried by the balls during their travel, lagging behind the balls with the effect that the balls wedge into the forward sides of the pockets of the separator and tend to spread the sections. This stress is evidently greatest adjacent the ends of the rotation axes of the antifriction members.

As here shown, sections 6 and 7 are both provided with peripheral fingers 8 and 9, respectively, abutting the opposed section substantially along its center line. In this construction each section is braced not only at its periphery but also at its center line and each is connected to the other along the ends of the rotation axes of the antifriction members. Preferably the fingers of one section, 6, are at its outer periphery and the fingers of the other section, 7, are at its inner periphery. In this way the elements of a pair of fingers are radially spaced and each section is, therefore, supported by a plurality of pairs of radially spaced struts. Thus, any teetering of a section about the end of a finger is obviated and also, when the sections are placed together, they are not liable to become bent or otherwise thrown out of alinement.

Preferably, and as shown in Figs. 1 to 4, inclusive, one section, as 6, is of lesser diameter than the other section, as 7, in order that the fingers 8 and 9 shall be straight and shall be perpendicular to the body portions of the sections. With the fingers straight, rather than bent or curved, they are not liable either to buckle and permit the body portions to approach and thus bind the balls or to straighten out and thus permit the body portions to recede from each other. With the fingers perpendicular they are not liable to bend at the point of connection with a body portion when either body portion is subjected to a laterally applied load tending to force it toward the opposed body portion. Moreover, not only does a particularly simple, strong and efficient structure result from the construction above described, but also, a separator having the form that the above construction produces—one section of greater diameter than the other—is of a form peculiarly well adapting it for use in a bearing the race members of which have inclined raceways. Thus, referring more particularly to Fig. 2, the above described separator is shown as assembled about, holding and separating the balls B of a bearing comprising the outer race member 1 and the inner race member 2 having the inclined raceways 1ᵃ and 2ᵃ, respectively. The inclinations of the raceways are provided by the substantially radially inwardly projecting shoulder 3 and the substantially radially outwardly projecting shoulder 4. With the races provided in this usual and illustrated manner, it will be seen that a separator, to be properly accommodated between the race members, should have one side of greater diameter than the other. Evidently the illustrated and above described separator fulfils this condition and is thus well adapted for use in such a bearing. Moreover, in a bearing, such as that illustrated, having its load line $y$—$y$ at approximately 35° to the radial line, when the separator sections are supported (by the fingers) along the respective center lines of the sections, they are at the same time supported approximately along the lines defined upon the sections by the respective adjacent ends of the rotation axes of the antifriction members.

The fingers of one section may be connected to the opposed section in any suitable manner. As here shown the fingers of one section are shouldered, as at C, to abut and support the other section and the extension of a finger above its shoulders is passed through an aperture in the mating section and may be fastened as by upsetting, as indicated at D. Since in manufacture, the sections are preferably stamped out, and the dies so made that all of the fingers of both sections are of the same length below their abutments (shoulders C) it will be seen that when the sections are assembled their body portions will be equispaced throughout their lengths.

The separator illustrated in Fig. 5 is designed more particularly for use in bearings whose raceways are not inclined. It is shown as comprising two sections of equal diameter having their fingers bent each at an acute angle, as indicated at F, whereby to bring the fingers of one section approximately to the center line of the opposite section and thus approximately to the line defined upon such section by the adjacent ends of the rotation axes of the antifriction members. But even in this type of Fig. 5 the fingers are substantially straight. That is, they are straight as compared with fingers used in certain separators and which fingers are bent semi-circularly to provide a semi-cylindrical portion adapted to serve as one half of a receptacle for a spacing ball. These substantially straight fingers are not open to the liability to buckle or straighten out present in fingers of the semi-cylindrical type, and therefore are well adapted to holding the body portions of the separator sections rigid with respect to each other.

Each section is shown as provided with the before referred to ball pockets 10 preferably formed to approximately conform to the surface curves of the antifriction members. These pockets not only retain the antifriction members in position but their surfaces, next the members, may serve as supports for films of lubricant. It is to be noted that, since the separator is in two originally separate sections these pockets may be formed in the sections prior to the assembling of the sections about the balls, whereas, were the separator in a single piece, the pockets must needs be formed in the two sides after the introduction of the balls. In this latter case there would be great danger of injuring the balls as well as great difficulty in properly shaping the pockets.

Preferably the balls B are received sufficiently loose in the separator to provide sufficient play to permit the series of balls being snapped over the upstanding side of the inner raceway, as the rear projection 2⁵ of the inner race member (Fig. 2). The separator then normally retains the balls upon the inner race member even though the same be removed from the outer race member.

It will be seen that I have provided a bearing having a separator of simple, efficient, rigid and inexpensive construction, which may be easily assembled, the sections of which are securely supported against crosswise bending, rigidly maintained in alinement, and fast connected against spreading and which, withal, may have a character particularly well adapting it for use between race members having inclined or generally oblique raceways.

Having thus described my invention, what I claim as new and desire to secure by Letters Patent is—

1. A separator for antifriction bearings, said separator being complete in two opposed side sections having seats for the antifriction members and receiving and positively spacing said members each from the other, one of said sections having at its edge substantially straight securing fingers integral with said section, said fingers being shouldered at their outer ends, passing through the other said side section at points in proximity to the line defined by the axes of rotation of the antifriction members, and being bent upon the said side section thus passed through; substantially as described.

2. A separator for antifriction balls, said separator being complete in two assembled opposed annular sections each provided with a series of ball seats coöperating with those of the other for receiving and positively spacing the balls, one said section having at its edge and between elements of its series of ball seats substantially straight securing fingers integral with the body portion of such section, and the other said section having in its body and between elements of its series of ball seats finger-receiving apertures at points in proximity to the line defined upon such body by the ends of the rotational axes of the balls to be received in said seats, said fingers being shouldered at their outer ends and passed through said apertures and bent upon the section thus passed through; substantially as described.

3. A separator for antifriction members comprising two opposed sections having their body portions spaced apart, there being provided two series of integral fingers extending between the body portions with certain of the fingers of one section abutting the opposed body portion and certain of the elements of at least one series being secured to the body portion to which they are opposed, abutting elements of one series being paired with secured elements of the other series with the elements of a pair opposite and spaced from each other by a substantial distance crosswise of the body portions at the points where such elements meet each of the body portions; substantially as described.

4. A separator for antifriction members comprising two opposed annular sections one of greater diameter than the other with the section of lesser diameter having straight fingers at its outer periphery, and the section of greater diameter having straight fingers at its inner periphery, said fingers of each section abutting the opposite section substantially along its center line and being perpendicular to the body portions of both said sections with the fingers of one section firmly connected to the opposite section; substantially as described.

5. A separator for antifriction bearings, said separator comprising opposed side sections having seats for the antifriction members, one of said sections having at its edge securing fingers integral with said section, said fingers being shouldered at their outer ends, passing through the other said side section at points in proximity to the line defined by the axes of rotation of the antifriction members, and being bent upon the said side section thus passed through, and the other said side section having fingers integral therewith, said latter mentioned fingers abutting against the inner face of the opposed said section; substantially as described.

6. A separator for antifriction bearings, said separator comprising opposed side sections having seats for the antifriction members, one of said sections having at its outer edge securing fingers integral with said section, and the other said section having at its inner edge securing fingers integral therewith, said fingers being shouldered at their outer ends, the fingers of each section extending through its opposed section at points in proximity to the line defined by the axes of rotation of the antifriction members and being bent upon such opposed section; substantially as described.

7. A separator for antifriction bearings, said separator comprising opposed side sections having seats for the antifriction members, one of said sections having at its edge securing fingers integral with said section and extending at substantially right angles to said sections, said fingers being shouldered at their outer ends, passing through the other said side section at points in proximity to the line defined by the axes of rotation of the antifriction members, and being bent upon the said side section thus passed through, and the other said side section having fingers integral therewith and extending therefrom at substantially right angles to the said side sections, said latter mentioned fingers abutting against the inner face of the opposed said section; substantially as described.

8. A separator for antifriction bearings, said separator comprising opposed side sections having seats for the antifriction members, one of said sections having at its outer edge securing fingers integral with said section, and the other said section having at its inner edge securing fingers integral therewith, said fingers extending at substantially right angles to said sections and being shouldered at their outer ends, the fingers of each section extending through its opposed section at points in proximity to the line defined by the axes of rotation of the antifriction members and being bent upon such opposed section; substantially as described.

In testimony whereof, I hereunto affix my signature, in the presence of two witnesses.

FREDERICK G. HUGHES.

Witnesses:
GEORGE M. MERRIMAN,
AGNES A. HUANE.

Correction in Letters Patent No. 1,176,455.

It is hereby certified that in Letters Patent No. 1,176,455, granted March 21, 1916, upon the application of Frederick G. Hughes, of Bristol, Connecticut, for an improvement in "Antifriction-Bearings," an error appears in the printed specification requiring correction as follows: Page 1, line 63, for the word "designed" read *designated;* and that the said Letters Patent should be read with this correction therein that the same may conform to the record of the case in the Patent Office.

Signed and sealed this 1st day of August, A. D., 1916.

[SEAL.]

F. W. H. CLAY,

*Acting Commissioner of Patents.*

Cl. 64—59.